United States Patent
Sato

(12) 
(10) Patent No.: US 6,245,701 B1
(45) Date of Patent: Jun. 12, 2001

(54) POROUS CERAMIC FOR PRODUCING ALKALI ION WATER, METHOD FOR PRODUCING THE POROUS CERAMIC AND DEVICE FOR PRODUCING THE ALKALI ION WATER

(75) Inventor: Takashi Sato, Fukuoka (JP)

(73) Assignee: Japan Zeolite, Inc., Fukuoka (JP)

( * ) Notice: Subject to any disclaimer, the term of this patent is extended or adjusted under 35 U.S.C. 154(b) by 0 days.

(21) Appl. No.: 09/238,573

(22) Filed: Jan. 28, 1999

(30) Foreign Application Priority Data

Jan. 30, 1998 (JP) .................................................. 10-033917
Dec. 29, 1998 (JP) .................................................. 10-377097

(51) Int. Cl.⁷ .......................... C04B 35/18; C04B 35/80; C04B 38/00; B01D 24/16
(52) U.S. Cl. ......................... 501/80; 501/95.1; 501/95.2; 501/119; 501/121; 501/122; 501/125; 501/127; 501/128; 501/130; 501/131; 501/153; 501/154; 210/290; 423/716
(58) Field of Search .................... 210/290; 423/700, 423/716; 501/80, 119, 121, 122, 125, 127, 128, 130, 131, 153, 154, 95.1, 95.2

(56) References Cited

U.S. PATENT DOCUMENTS

| | | |
|---|---|---|
| 4,510,066 | * 4/1985 | Saar . |
| 4,510,073 | * 4/1985 | Hara et al. . |
| 5,166,107 | * 11/1992 | Taga et al. ............................ 501/119 |
| 5,618,762 | * 4/1997 | Shirawaka et al. ...................... 501/1 |
| 5,637,212 | * 6/1997 | Kim .................................. 210/195.1 |
| 5,695,728 | * 12/1997 | Miura et al. . |
| 5,880,048 | * 3/1999 | Sato et al. ............................ 501/125 |

FOREIGN PATENT DOCUMENTS 4-071640 * 3/1992 (JP) .

OTHER PUBLICATIONS

Lewis, Hawley's Condensed Chemical Dictionary, p. 201, 1993.*

* cited by examiner

Primary Examiner—David R. Sample
(74) Attorney, Agent, or Firm—Kanesaka & Takeuchi

(57) ABSTRACT

The invention relates to a porous ceramic used for producing alkali ion water. The ceramic of the invention includes finely particulate zeolite having an average particle size of 0.1 to 40 $\mu$m and an alkali ion producing material as components. Besides the above components, the invention preferably comprises a fibrous mineral and/or a clay mineral. To produce the ceramic of the invention, a slurry obtained by grinding zeolite by a wet process, a slurry obtained by grinding the alkali ion producing material and the clay mineral by a wet process and a slurry obtained by grinding the fibrous mineral are first mixed and stirred to prepare a mixed slurry. This mixed slurry is then dried and fired to obtain a sintered body.

12 Claims, 3 Drawing Sheets

POROUS CERAMIC FOR PRODUCING ALKALI ION WATER, METHOD FOR PRODUCING THE POROUS CERAMIC AND DEVICE FOR PRODUCING THE ALKALI ION WATER

BACKGROUND OF THE INVENTION AND DESCRIPTION OF RELATED ART

The present invention relates to a porous ceramic for producing alkali ion water and a production method thereof.

A water purifier for general tap water is a device for filtering out suspended matter, residual chloride and microorganisms of coliform bacilli in the tap water and generally comprises a water purifier body and water treating materials such as active carbon and a hollow yarn filter, fitted as a unit in the interior of the purifier body.

A device for producing mineral water, comprising, together with the water treating materials, powder or splinters of a natural mineral, such as quartz porphyry or coral sand, which is fitted as a unit in the interior of a purifier body, has also been used conventionally for the purpose of producing mineral water in addition to the purified water.

The above-described water purifier for tap water is so constructed that water to be treated is passed through a single or multiple layer formed of active carbon and a hollow yarn filter. However, microorganisms of coliform bacilli have been detected in treated water at the initial stage upon its actual use. In addition, since the treated water has no bacteriostasis, there has been a possibility that the microorganisms may proliferate in the treated water.

In the conventional device for producing mineral water on the other hand, only a trace amount of minerals is dissolved out, so that the amount of minerals for producing the mineral water to be used must be increased for ensuring that the minerals are dissolved out in a prescribed amount. Therefore, it is unavoidable that the device is made larger, and so such a device inconveniently becomes large beyond the household unit size in the scales of weight and volume.

OBJECTS AND SUMMARY OF THE INVENTION

It is an object of the present invention to provide a porous ceramic for producing alkali ion water, by which a great amount of minerals can be dissolved out easily and efficiently.

Another object of the present invention is to provide a porous ceramic for producing alkali ion water, by which alkali ion water can be stably supplied upon the production of the alkali ion water.

A further object of the present invention is to provide a porous ceramic for producing alkali ion water, from which alkali ions such as sodium and calcium can be dissolved out by the reaction with water to make the pH of treated water alkaline and to provide the treated water as alkali ion water.

Still a further object of the present invention is to provide a porous ceramic for producing alkali ion water, which can make the pH of treated water alkaline, thereby imparting an antibacterial effect on microorganisms in the treated water.

Yet still a further object of the present invention is to provide a method for producing a useful porous ceramic which can efficiently produce the above alkali ion water.

The porous ceramic according to the present invention comprises finely particulate zeolite having an average particle size of 0.1 to 40 $\mu$m and an alkali ion producing material as components, wherein the components are fired into a sintered body. The ceramic according to the present invention may comprise a fibrous mineral and/or a clay mineral as a component. In this case, it may be preferable to use sepiolite and a kaolin group mineral as the fibrous mineral and the clay mineral, respectively.

The ceramic according to the present invention reacts with water to dissolve out alkali ions. Examples of the alkali ions include sodium, potassium, calcium and magnesium ions.

A device according to the present invention for producing the alkali ion water comprises a porous ceramic layer formed by charging the above-described porous ceramic into a tank, and is so constructed that water is passed through the porous ceramic layer. In the present invention, the device may also be so constructed that a layer of an active carbon filter and a layer of a hollow yarn filter are provided in addition to the porous ceramic layer to exhibit a filtering function against suspended matter and microorganisms.

The porous ceramic according to the present invention is excellent in water absorption property and hydrophilic nature and hence has an effect of being able to dissolve out a great amount of alkali ions with ease in contact with water to produce alkali ion water efficiently. In addition, the present invention has an effect of being able to stably supply alkali ion water over a long period of time upon the production of the alkali ion water. The alkali ion water produced contains useful components such as calcium and magnesium, makes the blood alkaline to facilitate the circulation of the blood, and serves both as a health drink which can contribute to the promotion of health and as a drink high in antibacterial activity due to its alkaline pH and safe for the human body.

Further, the ceramic according to the present invention permits the production of both alkali ion water in a pH region suitable for drinking and alkali ion water in a higher pH region suitable for sterilization and cleaning and hence has the advantage of being able to produce alkali ion water suited to the end application intended.

DETAILED DESCRIPTION OF PREFERRED EMBODIMENTS OF THE INVENTION

Figure 1:
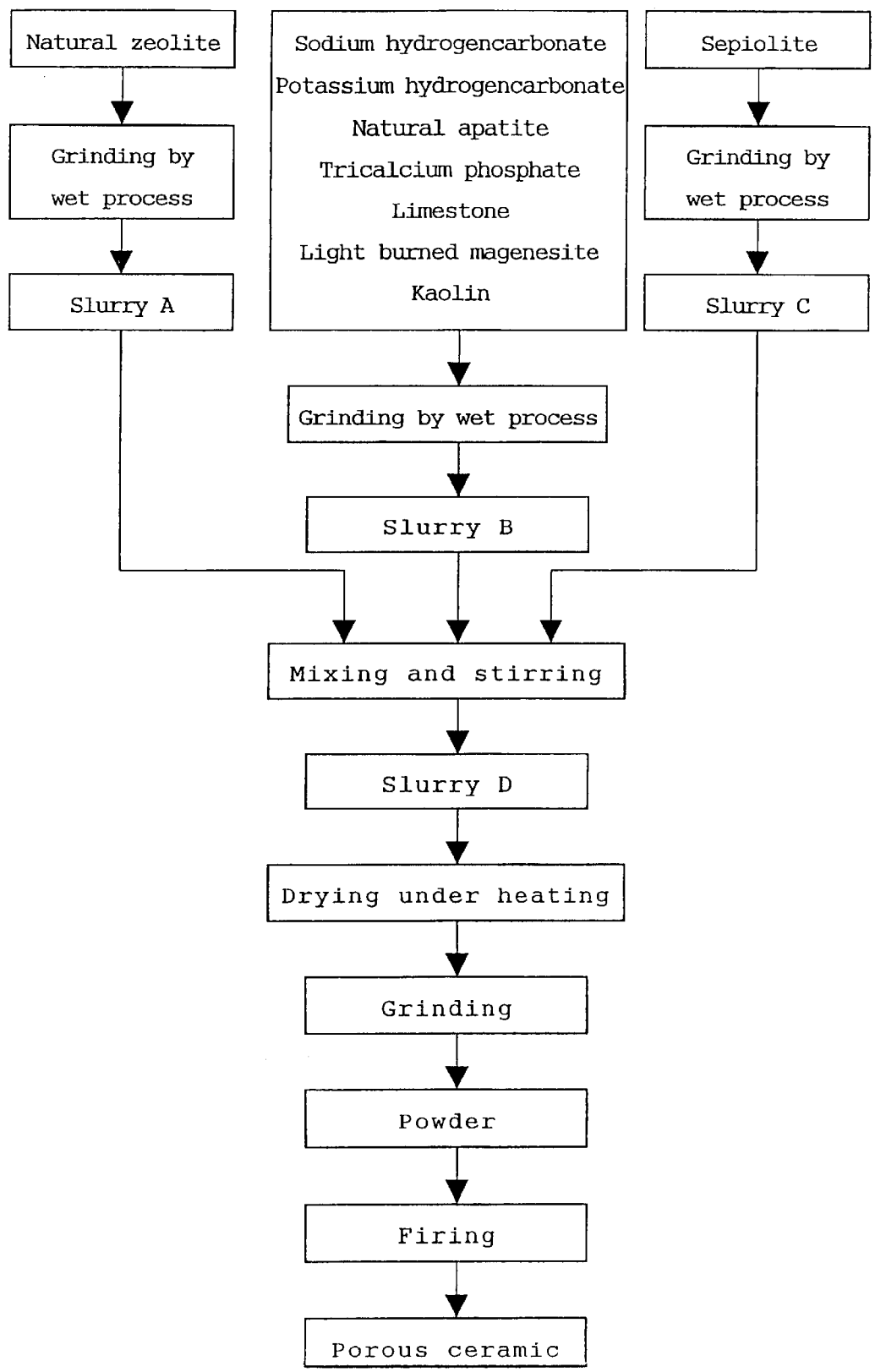
FIG. 1 is a flow diagram illustrating the production process of the ceramic according to the present invention.

The present invention will hereinafter be described in detail with reference to the accompanying drawings.

The porous ceramic according to the present invention comprises zeolite and an alkali ion producing material as components.

Zeolite used as a raw material for the ceramic is preferably natural zeolite. Zeolite is present in the form of fine particles in a sintered body, and the average particle size thereof is 0.1 to 40 $\mu$m, preferably 0.1 to 20 $\mu$m. If the particle size is smaller than 0.1 $\mu$m, the exit velocity of treated water from the resulting device becomes slower. If the particle size exceeds 40 $\mu$m on the other hand, it is difficult for the resulting ceramic to stably dissolve out alkali ions.

In the present invention, the alkali ion producing material means a substance which dissolves out alkali ions in contact with water. Here, the alkali ions mean alkali metal ions and alkaline earth metal ions. Examples of the alkali metal ions include sodium and potassium ions, and examples of the alkaline earth metal ions include calcium and magnesium ions. Sodium ion producing substances include sodium salts such as sodium hydrogencarbonate, and potassium ion producing substances include potassium salts such as potassium hydrogencarbonate. On the other hand, calcium ion producing substances include calcium salts such as calcium phosphate and calcium carbonate. For examples, natural apatite and tricalcium phosphate, etc. may be used as substances containing calcium phosphate as a main component, while calcite, limestone, etc. may be used as substances containing calcium carbonate as a main component.

Further, magnesium ion producing substances include magnesium salts such as magnesium carbonate. For example, magnesite may be used as a substance containing magnesium carbonate as a main component.

In the present invention, the alkali ion producing material is composed of one of the above-mentioned sodium ion producing substances, potassium ion producing substances, calcium ion producing substances and magnesium ion producing substances, or a mixture of two or more substances thereof.

The composition of the ceramic according to the present invention consists of 10 to 99 wt. % of the zeolite and 1 to 90 wt. % of the alkali ion producing material.

The present invention comprises the above-described zeolite and alkali ion producing material as components. However, a fibrous mineral and/or a clay mineral may be added as a component to the above components as needed. In this case, only a fibrous mineral or a clay mineral may be added, or both fibrous mineral and clay mineral may be added. Sepiolite, asbestos or the like may be used as the fibrous mineral, with sepiolite being particularly preferred. Sepiolite has a form that long fibers have been bundled. In the ceramic according to the present invention, sepiolite is present as a three-dimensionally extending linear structure in a sintered body. The maximum diameter of the long fiber bundle in sepiolite is preferably 1 to 20 $\mu$m.

As the clay mineral, there may be used a kaolin group mineral, mica group mineral, montmorillonite group mineral or the like. Of these, the kaolin group mineral is particularly preferred. The average particle size of the clay mineral is preferably 0.1 to 40 $\mu$m.

When the fibrous mineral and clay mineral are added as components, the composition of the ceramic according to the present invention consists of 10 to 98 wt. % of zeolite, 1 to 80 wt. % of the alkali ion producing material, 0.1 to 20 wt. % of the fibrous mineral and 0.1 to 60 wt. % of the clay mineral.

The ceramics according to the present invention have a structure that the alkali ion producing material is carried on a matrix composed of fine particulate zeolite having an average particle size of 0.1 to 40 $\mu$m and also have a porous structure in which a great number of pores are formed. These pores are connected to the surfaces of the ceramics and function as passageways through which water penetrates into the interior of the ceramics and passageways through which alkali ions diffuse into water. They have an open pore structure of a complicated inkpot-like shape. The ceramics according to the present invention become excellent in water absorption property and hydrophilic nature due to such a pore structure.

The average pore size of the pores in the porous structure of the ceramics according to the present invention is 0.05 to 40 $\mu$m, preferably 0.05 to 20 $\mu$m, and the porosity as a porous body is 5 to 60%, preferably 15 to 60%.

Since the ceramics according to the present invention comprises the fine particulate zeolite having an average particle size of 0.1 to 40 $\mu$m as a component, the alkali ion producing material carried on the zeolite is also present in the form finely and evenly dispersed in the interior of the porous body.

The methods for producing the ceramics according to the present invention will now be described.

Respective raw materials for zeolite and the alkali ion producing material are separately ground by a wet process to prepare a slurry of zeolite and a slurry of the alkali ion producing material. These slurries are mixed and stirred to prepare a mixed slurry, and the mixed slurry is then dried and fired to produce a sintered body, thereby obtaining a porous ceramic according to the present invention.

When the fibrous mineral and clay mineral are blended as raw materials, raw materials are divided into three portions of ① zeolite, ② a mixture of the alkali ion producing material and the clay mineral, and ③ the fibrous mineral. The raw materials ①, ② and ③ are then separately ground to a wet process to prepare a slurry of the raw material ①, a slurry of the raw material ② and a slurry of the raw material ③. These three kinds of slurries are mixed and stirred to prepare a mixed slurry, and the mixed slurry is then dried and fired to obtain a porous ceramic.

Incidentally, it is possible to adopt, as a process for preparing the mixed slurry, a process comprising mixing the respective raw materials with each other in advance, and grinding the mixture of the raw materials by a wet process to prepare a slurry of the mixed raw material without adopting the above-described process comprising separately grinding the raw materials by a wet process to prepare respective slurries and mixing these slurries. However, the first-mentioned process is preferred.

A preferred embodiment of the production method of the ceramic according to the present invention will hereinafter be described with reference to FIG. 1.

In this embodiment, the case where zeolite, alkali ion producing material, fibrous mineral and clay mineral are used as raw materials for producing a ceramic is described.

Specifically, there are respectively used natural zeolite as zeolite, sodium hydrogencarbonate, potassium hydrogencarbonate, natural apatite, tricalcium phosphate, limestone and light burned magnesite as the alkali ion producing material, sepiolite as the fibrous mineral, and kaolin as the clay mineral.

The blending proportions of the respective raw materials are as follows:

| | |
|---|---|
| Natural zeolite | 50 wt. % |
| Sodium hydrogencarbonate | 4 wt. % |
| Potassium hydrogencarbonate | 1 wt. % |
| Natural apatite | 10 wt. % |
| Tricalcium phosphate | 5 wt. % |
| Limestone | 5 wt. % |
| Light burned magnesite | 4 wt. % |
| Sepiolite | 8 wt. % |
| Kaolin | 13 wt. %. |

Water is added to the natural zeolite so as to give a solid content of 35 to 45 wt. %, to grind the natural zeolite by a wet process in a ball mill. This wet grinding provides a slurry (hereinafter referred to as Slurry A) of the natural zeolite finely ground to a particle size of 0.1 to 40 $\mu$m.

Sodium hydrogencarbonate, potassium hydrogencarbonate, natural apatite, tricalcium phosphate, limestone, light burned magnesite and kaolin are then mixed to one another, and water is added to the mixture so as to give a total solid content of 45 to 55 wt. %, to grind the mixture by a wet process in a ball mill. This wet grinding provides a slurry (hereinafter referred to as Slurry B).

Further, water is added to sepiolite so as to give a solid content of 5 to 10 wt. %, to grind sepiolite by a wet process in a ball mill, thereby obtaining a slurry (hereinafter referred to as Slurry C).

The thus-obtained Slurries A, B and C are weighed, mixed and stirred to obtain a homogenized mixed slurry (hereinafter referred to as Slurry D).

Slurry D is then forcedly dried by heating. Although bubbles are mixed into Slurry D by the mixing and stirring upon the preparation of the mixed slurry, the mixing of bubbles can be increased by further vigorously stirring the slurry in the drying process, thereby obtaining a dry product in which a great number of bubbles have been taken. The dry product obtained by the drying under heating is ground into powder. The powder is placed in a kiln and fired. The firing temperature is 700 to 1,150° C. After the firing, the resultant sintered body is cooled in the kiln to obtain a ceramic according to the present invention.

In the present invention, the following step may also be adopted as a step after the preparation of Slurry D. Namely, Slurry D is subjected to a dehydration treatment without being forcedly dried as described above, thereby preparing a clayey product having shapability. This clayey product is then shaped into a desired form and dried. In this shaping step, no deaerating treatment is conducted. Therefore, the bubbles (bubbles generated upon the stirring of the slurry) mixed in Slurry D are left as they are, so that a dry product, in which bubbles have been taken, is obtained. The dry product is then fired at a firing temperature of 700 to 1,150° C. into a sintered body. The sintered body is cooled in the kiln to obtain a ceramic according to the present invention.

In the production of the ceramic according to the present invention, the sintered body is dehydrated and decarbonated and moreover made amorphous by a thermal reaction in the firing step, thereby obtaining a chemically unstable ceramic having high activity.

In order to produce alkali ion water using a ceramic according to the present invention, there may be used either a method in which the ceramic according to the present invention is placed within a passageway of water to pass water through the thus-formed ceramic layer, or a method in which water is placed in a container such as a tank, and the ceramic according to the present invention is immersed into water. In any method, water penetrates into the interior of the porous body of the ceramic to come into contact with the alkali ion producing material, whereby alkali ions are dissolved out in water in such a wet state.

Since the ceramic according to the present invention comprises fine particulate zeolite having an average particle size of 0.1 to 40 $\mu$m as a matrix, and the alkali ion producing material carried on this matrix is present in the form finely and evenly dispersed in the interior of the porous body, the contact efficiency of the alkali ion producing material with water is high. Therefore, the dissolution of the alkali ions is made easy, and the alkali ions can be efficiently dissolved out.

In addition, the present invention has the advantage of being able to continuously dissolve out alkali ions over a long period of time to stably supply alkali ion water.

The alkali ion water is produced by the dissolution of alkali ions. This alkali ion water exhibits an alkaline nature and moreover is rich in mineral components such as calcium and magnesium.

The pH of the alkali ion water produced by using the ceramic according to the present invention may be controlled from 7.2 to 11.0 provided that the pH of raw water is 7.0 in a neutral region. When the amount of alkali ions dissolved out is increased, the pH of alkali ion water is also raised correspondingly. When the amount of alkali ions dissolved out is decreased to the contrary, the pH of the alkali ion water can be controlled near pH 7.0. As described above, the pH of the alkali ion water can be changed under the control of the amount of the alkali ions dissolved out.

Since finely particulate zeolite is used as a raw material for the ceramic in the present invention, the average pore size and porosity of pores in the porous body can be controlled with ease by controlling the temperature upon the firing. The amount of alkali ions dissolved out can be controlled by controlling the average pore size and porosity in this manner.

As described above, alkali ion water having a pH of 7.2 to 11.0 can be produced by using the ceramic according to the present invention. In general, alkali ion water in a weakly alkaline region is used as drinking water, while alkali ion water in a relatively stronger alkaline region is used as wash water. For example, pH 8.5 is defined as a boundary to use alkali ion water having a pH of 7.2 to 8.5 as drinking water and use alkali ion water in a pH region from pH 8.5 to pH 11.0 as both wash water and life prolonging water for cut flowers.

Since the alkali ion water produced by using the ceramic according to the present invention exhibits an alkaline nature, it has high antibacterial activity against microorganisms if mixed in. Therefore, the alkali ion water can be used as drinking water without any sanitary problem and is safe. When it is used as wash water, this wash water is suitable for use as, for example, wash water for vegetables, since it has antibacterial cleanability.

As the method in which the ceramic according to the present invention is placed within a passageway of water to produce alkali ion water, there may be adopted, for example, a method in which the ceramic according to the present invention is filled in the interior of a cylinder, an end of the cylinder is connected to a supply source of water (for example, a tap of city water) to pass water through a layer of the ceramic within the cylinder, and alkali ion water produced is flowed out of another end of the cylinder.

In this method, water continuously flows into the ceramic layer. It is therefore preferred that the dissolution of alkali ions be made efficiently in a short period of time, and it is hence preferred that the dissolution rate of alkali ions be higher.

On the other hand, in the case where the ceramic according to the present invention is immersed into water contained in a container such as a tank to produce alkali ion water, it is preferred that the dissolution of alkali ions be continuously made little by little over a long period of time, since a fixed amount of water is in a state stored in the container, and it is hence preferred that the dissolution rate of alkali ions be relatively lower.

In the present invention, when sepiolite, which is a fibrous structure, is contained as a component of the ceramic, the dissolution of alkali ions becomes still easier. More specifically, sepiolite forms a capillary structure in the porous body, so that components such as calcium ionized by the contact with water diffuse through the capillary structure of sepiolite by capillarity and transfer from a high-ion concentration region to water on a low concentration side through capillary tubes. By such action, alkali ions are efficiently dissolved out of the porous ceramic, and so the dissolution efficiency can be more enhanced.

When alkali ion water is produced by using the ceramic according to the present invention, active carbon may be used in combination with the ceramic according to the present invention, or a mixture of the ceramic according to the present invention and active carbon may also be used.

An embodiment where a ceramic according to the present invention is actually applied to a device for producing alkali ion water will hereinafter be described with reference to FIG. 2.

Figure 2:
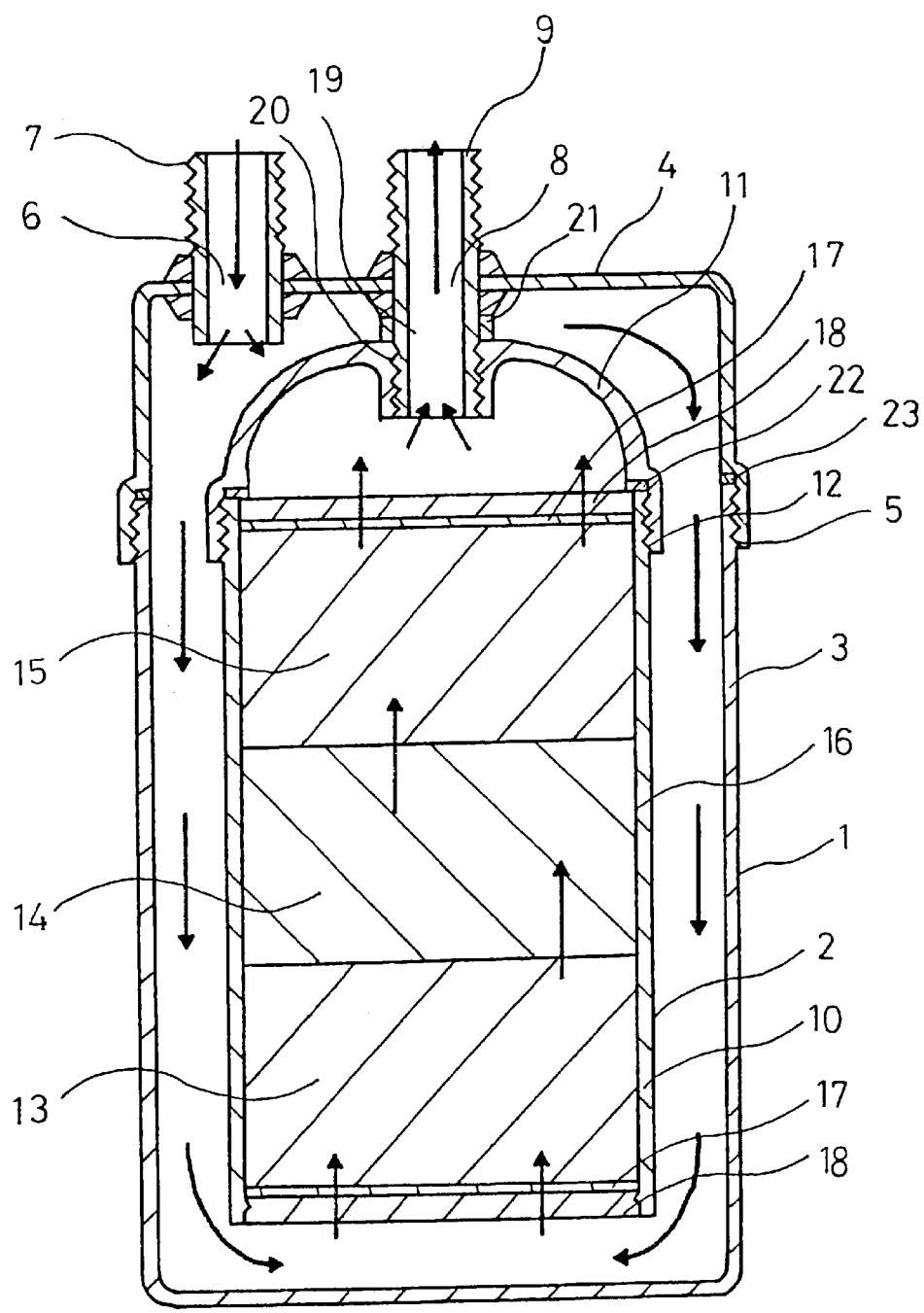
FIG. 2 is a longitudinal cross-sectional view illustrating an embodiment of a device for producing alkali ion water, to which the ceramic according to the present invention has been applied.

As illustrated in FIG. 2, the device for producing alkali ion water is equipped with a double container structure composed of an outer container 1 provided as a cylindrical container and an inner container 2 provided within the outer container 1. The outer container 1 is composed of an outer container body 3 and an outer container cover 4, and both parts are connected by a screw fitting structure 5.

An inlet port 6 through which raw water is fed into the container is provided in the outer container cover 4, and a connecting pipe 7 is provided in the inlet port 6 in such a manner that a raw water feeding pipe (not illustrated) can be connected thereto. In the cover 4, is further provided an outlet port 8 for flowing alkali ion water produced out of the container, and a connecting pipe 9 is provided in the outlet port 8 in such a manner that an alkali ion water-discharging pipe (not illustrated) can be connected thereto.

The inner container 2 is composed of an inner container body 10 and an inner container cover 11, and both parts are connected by a screw fitting structure 12. Active carbon, hollow yarn and the porous ceramic according to the present invention are successively stacked in that order from the bottom within the tank of the inner container body 10 to form an active carbon filter layer 13, a hollow yarn filter layer 14 and a porous ceramic layer 15. A water-through layer 16 is composed of these three layers, and a non-woven fabric 17 and a grating 18 are fitted to each of the upper and lower surfaces of the water-through layer 16. The porous ceramic layer 15 may be either a layer formed by filling the ceramic according to the present invention comprising zeolite and alkali ion producing material as components into the tank, or a layer formed by filling the ceramic according to the present invention comprising zeolite, alkali ion producing material, fibrous mineral and clay mineral as components into the tank.

The inner container cover 11 is connected by a screw fitting structure 20 to an inner extension pipe 19 extending from the connecting pipe 9 provided in the outlet port. In FIG. 2, reference numerals 21, 22 and 23 indicate rubber packings.

In order to produce alkali ion water using the device for producing the alkali ion water constructed in the above-described manner, raw water is first fed into the container through the inlet port 6. As the raw water, tap water is generally used. However, water other than the tap water may also be used.

The raw water flowing into the container flows downward through a passageway between the outer container 1 and the inner container 2 and enters the water-through layer 16 through the grating 18 and the non-woven fabric 17 from the bottom of the inner container 2. The flow of the raw water turns upward in the water-through layer 16, and the water first passes through the active carbon filter layer 13. Residual chloride and suspended matter are removed from the water here. The water then enters the hollow yarn filter layer 14 which is an intermediate layer. In this layer, finely suspended matter and microorganisms, which have been unable to be removed by the active carbon filter layer 13, are removed, and the water further flows into the porous ceramic layer 15 which is the last layer.

In the porous ceramic layer 15, water penetrates into the interior of the porous body as described above and comes into contact with the alkali ion producing material, whereby alkali ions are dissolved out in water. The thus-produced alkali ion water flows out of the porous ceramic layer 15 and flows above the water-through layer 16 through the non-woven fabric 17 and the grating 18 and out of the container through the outlet port 8.

Incidentally, when the filtering function and alkali ion water-producing function of the water-through layer 16 are lowered by long-term use, the inner container 2 as a unit can be exchanged for a new unit.

Alkali ion water obtained in the above-described manner is water, which contains neither suspended matter nor impurities and is rich in alkali ions such as calcium and magnesium, and is optimum as a health drink. In addition, since its pH region is in an alkaline region, this alkali ion water is in an environment that microorganisms such as *Escherichia coli* are hard to inhabit, so that alkali ion water is provided as a drink safe for the human body because such an antibacterial action is exhibited.

In the above-described device for producing alkali ion water, the water-through layer 16 has been composed of the three layers of the active carbon filter layer 13, the hollow yarn filter layer 14 and the porous ceramic layer 15. However, as another embodiment, the water-through layer 16 may be composed of either two layers of the active carbon filter layer 13 and the porous ceramic layer 15 or a single layer of the porous ceramic layer 15 alone. As a further embodiment of the present invention, the porous ceramic layer 15, the active carbon filter layer 13 and the hollow yarn filter layer 14 may be successively formed in that order from the bottom.

Further, the water-through layer may also be so constructed that a mixture of the porous ceramic according to the present invention and active carbon is filled as a mixed layer into the tank without separately providing the porous ceramic layer 15 and the active carbon filter layer 13, and raw water is passed through this mixed layer.

When water is passed through the water-through layer 16, it is preferred that the time and distance during which water is in contact with the water-through layer 16 be as long as possible. When the contact time of water with the water-through layer 16 is long, and its contact area is great, the amount of alkali ion dissolved out is increased, and the removal of suspended matter and the like is also made more effectively. In order to make the contact time of the water with the water-through layer 16 long as described above, it is preferred that the flow path of water be constructed as illustrated in FIG. 3.

Figure 3:
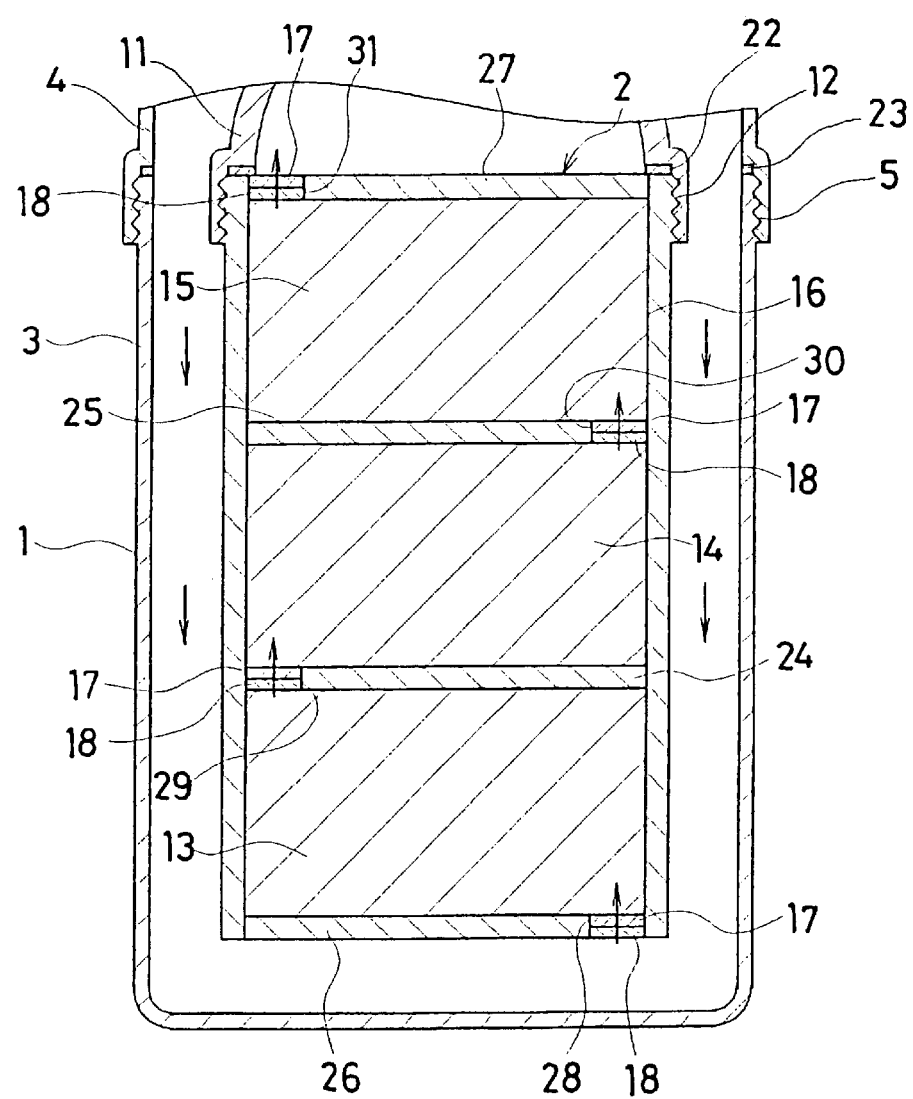
FIG. 3 is a longitudinal cross-sectional view illustrating another constructional embodiment of a water-through layer in an inner container.

Namely, as illustrated in FIG. 3, partition walls 24 and 25 are respectively provided between the active carbon filter layer 13, the hollow yarn filter layer 14 and the porous ceramic layer 15, and walls 26 and 27 are provided on the lower surface of the active carbon filter layer 13 and the upper surface of the porous ceramic layer 15, respectively. Through-holes 28, 29, 30 and 31 are provided in these walls 26, 27 and partition walls 24, 25, respectively. A non-woven fabric 17 and a grating 18 are fitted to each of the through-holes 28, 29, 30 and 31.

The through-holes 28, 29, 30 and 31 are preferably provided at the most distant positions from one another.

When the water-through layer is constructed in such a manner, raw water flowing into the active carbon filter layer 13 through the through-hole 28 cannot enter the hollow yarn filter layer 14 unless it passes through the through-hole 29 situated at the most distant position from the through-hole 28. Therefore, the contact time of water with the active carbon filter layer 13 becomes long, and its contact area also becomes great.

What is claimed is:

1. A porous ceramic for producing alkali ion water, comprising finely particulate zeolite having an average particle size of 0.1 to 40 μm, an alkali ion producing material and fibrous mineral as components, said components being fired to form a sintered body.

2. The porous ceramic according to claim 1 for producing alkali ion water, which is composed of 10 to 99 wt. % of the zeolite and 1 to 90 wt. % of the alkali ion producing material.

3. The porous ceramic according to claim 1 for producing alkali ion water, wherein the alkali ion producing material is composed of one of sodium ion producing substances, potassium ion producing substances, calcium ion producing substances and magnesium ion producing substances, or a mixture of two or more substances thereof.

4. The porous ceramic according to claim 1 for producing alkali ion water, wherein the fibrous mineral is sepiolite.

5. A porous ceramic for producing alkali ion water, comprising finely particulate zeolite having an average particle size of 0.1 to 40 μm, an alkali ion producing material, a fibrous mineral and a clay mineral as components, wherein the components are fired into a sintered body.

6. The porous ceramic according to claim 5 for producing alkali ion water, wherein the clay mineral is a kaolin group mineral.

7. The porous ceramic according to claim 5 for producing alkali ion water, wherein an average particle size of the clay mineral is 0.1 to 40 μm.

8. The porous ceramic according to claim 5 for producing alkali ion water, which is composed of 10 to 98 wt. % of the zeolite, 1 to 80 wt. % of the alkali ion producing material, 0.1 to 20 wt. % of the fibrous mineral and 0.1 to 60 wt. % of the clay mineral.

9. A method for producing a porous ceramic for producing alkali ion water, comprising separately grinding respective raw materials for zeolite and an alkali ion producing material by a wet process to prepare a slurry of the zeolite and a slurry of the alkali ion producing material, mixing and stirring these slurries to prepare a mixed slurry, and then drying and firing the mixed slurry to obtain a sintered body.

10. A device for producing alkali ion water, comprising a tank, a porous ceramic layer provided in the tank and formed of a porous ceramic comprising finely particulate zeolite having an average particle size of 0.1 to 40 μm and an alkali ion producing material as components, which are fired to form a sintered body, and a layer of an active carbon filter provided in the tank near the porous ceramic layer so that water is passed through the porous ceramic layer and the layer of the active carbon filter.

11. A device for producing alkali ion water, comprising a mixed layer formed by mixing active carbon with a porous ceramic comprising finely particulate zeolite having an average particle size of 0.1 to 40 μm and an alkali ion producing material as components, which are fired into a sintered body, and charging the resultant mixture into a tank, wherein the device is so constructed that water is passed through the mixed layer.

12. A device for producing alkali ion water, comprising a porous ceramic layer provided by charging a porous ceramic comprising finely particulate zeolite having an average particle size of 0.1 to 40 μm, an alkali ion producing material, a fibrous mineral and a clay mineral as components, which are fired into a sintered body, into a tank, wherein the device is so constructed that water is passed through the porous ceramic layer.

* * * * *